US010783330B2

(12) United States Patent
Ford et al.

(10) Patent No.: US 10,783,330 B2
(45) Date of Patent: Sep. 22, 2020

(54) UNDERSTANDING NATURAL LANGUAGE USING TUMBLING-FREQUENCY PHRASE CHAIN PARSING

(71) Applicant: QwikIntelligence, Inc., Marriottsville, MD (US)

(72) Inventors: William Randolph Ford, Marriottsville, MD (US); Alfred Rives Berkeley, III, Baltimore, MD (US)

(73) Assignee: QwikIntelligence, Inc., Marriottsville, MD (US)

( * ) Notice: Subject to any disclaimer, the term of this patent is extended or adjusted under 35 U.S.C. 154(b) by 0 days.

(21) Appl. No.: 16/657,014

(22) Filed: Oct. 18, 2019

(65) Prior Publication Data

US 2020/0125641 A1    Apr. 23, 2020

Related U.S. Application Data

(60) Provisional application No. 62/748,200, filed on Oct. 19, 2018.

(51) Int. Cl.
*G06F 17/27* (2006.01)
*G06F 40/30* (2020.01)
(Continued)

(52) U.S. Cl.
CPC ............ *G06F 40/30* (2020.01); *G06F 40/211* (2020.01); *G06F 40/242* (2020.01); *G06F 40/284* (2020.01)

(58) Field of Classification Search
CPC ...................................................... G06F 17/27
(Continued)

(56) References Cited

U.S. PATENT DOCUMENTS 4,730,270 A * 3/1988 Okajima ............... G06F 40/211
704/2
5,095,432 A   3/1992 Reed
(Continued)

OTHER PUBLICATIONS

Abney, S. "Parsing by Chunks" Principle-Based Parsing, R. Berwick, S. Abney, C. Tenny (eds.), Kluwer Academic Publishers., Nov. 10, 1994, pp. 1-18.

(Continued)

*Primary Examiner* — Michael Colucci
(74) *Attorney, Agent, or Firm* — Cameron LLP

(57) ABSTRACT

Of the four primary approaches to processing language by computer, only the parsing approach considers the semantic and syntactic components from the start. In doing so, however, the required resources expand rapidly as the scope of the language processed increases. And as that scope increases, the performance of parsing systems decreases. A natural language processor uses a tumbling-frequency phrase-chain parser as described herein which circumvents this resource-intensive step in parsing, while quickly and almost effortlessly arriving at higher speeds and greater efficiency in natural-language processing with far more accurate results involving a partitioning dictionary and phrase chains, and, more particularly, to the discovery that a small and finite set of "phrase chains" created using a parsing-based phrase-chain processor accounts for a considerable percentage of human language. The significance of this result is that these phrase chains, once identified, can be programmatically pre-encoded for deep structure (meaning) thus allowing for simpler, faster, and more accurate natural language processing at a semantic level than other known parsing approaches.

12 Claims, 2 Drawing Sheets

(51) Int. Cl.
*G06F 40/211* (2020.01)
*G06F 40/242* (2020.01)
*G06F 40/284* (2020.01)

(58) Field of Classification Search
USPC ......... 704/9, 4, 2, 6, 231, 3, 10, 7; 715/255, 715/206, 256, 205; 706/12, 55; 707/728, 707/769
See application file for complete search history.

(56) References Cited

U.S. PATENT DOCUMENTS

| | | | | |
|---|---|---|---|---|
| 5,551,049 | A * | 8/1996 | Kaplan | G06F 40/247 |
| | | | | 715/206 |
| 5,926,784 | A | 7/1999 | Richardson et al. | |
| 5,930,746 | A | 7/1999 | Ting | |
| 6,108,620 | A | 8/2000 | Richardson et al. | |
| 6,236,959 | B1 | 5/2001 | Weise | |
| 6,285,978 | B1 * | 9/2001 | Bernth | G06F 40/51 |
| | | | | 704/7 |
| 7,197,451 | B1 * | 3/2007 | Carter | G06F 40/30 |
| | | | | 704/10 |
| 7,360,151 | B1 * | 4/2008 | Froloff | G06F 40/186 |
| | | | | 715/255 |
| 7,389,225 | B1 * | 6/2008 | Jensen | G06F 40/30 |
| | | | | 704/9 |
| 7,599,831 | B2 | 10/2009 | Ford | |
| 9,720,903 | B2 | 8/2017 | New | |
| 9,916,420 | B2 * | 3/2018 | Cardoza | G06F 19/32 |
| 10,032,127 | B2 * | 7/2018 | Habboush | G06N 5/025 |
| 10,185,748 | B1 * | 1/2019 | Ayzenshtat | G06F 16/90324 |
| 10,496,743 | B2 * | 12/2019 | Snider | G16H 10/60 |
| 2004/0019482 | A1 * | 1/2004 | Holub | G06Q 50/24 |
| | | | | 704/231 |
| 2007/0073745 | A1 * | 3/2007 | Scott | G06F 16/374 |
| 2007/0106491 | A1 * | 5/2007 | Carter | G06F 40/30 |
| | | | | 704/4 |
| 2007/0106651 | A1 * | 5/2007 | Isaacson | H04N 21/4394 |
| 2010/0228693 | A1 * | 9/2010 | Dawson | G06F 16/322 |
| | | | | 706/12 |
| 2013/0041685 | A1 * | 2/2013 | Yegnanarayanan | G06F 19/00 |
| | | | | 705/2 |
| 2017/0277676 | A1 * | 9/2017 | Vogel | G06F 40/284 |
| 2017/0277996 | A1 * | 9/2017 | Vogel | G06F 40/30 |

OTHER PUBLICATIONS

Bobrow, D., Kaplan, R., Kay, M., Norman, D., Thompson, H. and Winograd, T. (1977) GUS, a frame driven dialog system, Artificial Intelligence, 8: 155-173.

Chomsky, N. Verbal Behavior, by B. F. Skinner, Language, 1959, 35, 26-58.

Farreras, I. G., & Ford, W. R. (Jun. 2014), "The evolution of a discipline: How the semantics of introductory psychology textbooks have changed over the last century," paper presented at the 46th annual meeting of Cheiron: The International Society for the History of Behavioral and Social Sciences, Frederick, MD.

Ford, W. R., & Farreras, I. G. (Apr. 2015), "Using a multi-stage pattern reduction NLP for syntactic analysis of unstructured data," paper presented at the 2015 Analytics Applications Summit, Harrisburg, PA.

Gervain, J, et al. (2013), "Word frequency cues word order in adults: cross-linguistic evidence," Front. Psychol., 02.

Green, C. (1969), "Theorem proving by resolution as a basis for question-answering systems," Machine Intelligence, 4: pp. 183-205.

Hill, J. R., Ford, W. R., & Farreras, I. G. (2015), "Real conversations with artificial intelligence: A comparison between human-human online conversations and human-chatbot conversations," Computers in Human Behavior, 49, pp. 245-250.

Sowa, J., "Pursuing the Goal of Language Understanding," paper presented at the 2015 Analytics Applications Summit, Harrisburg, PA.

* cited by examiner

UNDERSTANDING NATURAL LANGUAGE USING TUMBLING-FREQUENCY PHRASE CHAIN PARSING

This application claims the benefit of the right of priority to U.S. provisional patent application Ser. No. 62/685,622 filed Oct. 19, 2018, by the same inventors and incorporated by reference as to its entire contents. Portions of the disclosure of this patent document contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present embodiments relate generally to the field of natural language processing. To be more specific, this invention relates to parsing, a first step performed in most transformation grammar approaches to processing natural language.

BACKGROUND

The need for computer-based technology to process human language is more critical now than ever before. Every day we are collecting "digital mountains" of human communication. However, human communication can only be partially analyzed at best using standard approaches in natural language processing. And while over the last five decades, many complex methods and algorithms for processing natural language have been developed, efforts to find more practical and efficient natural language processing solutions have now dramatically intensified and expanded in reaction to process and understand the ever-growing unstructured-data content on big data systems.

Four primary approaches have developed in natural language processing by a natural language processor (NLP) over the last half century: 1) transformational grammar simulations, 2) keyword/key-phrase approaches, 3) surface-structure matching, and 4) statistical language processing. A Bibliography is provided at the end of the DETAILED DESCRIPTION for those interested in understanding the state of the art of natural language processing.

Two of these four approaches, transformational grammar and statistical language processing, attempt to uncover the meaning (deep structure) of the human communication being analyzed. While the remaining two approaches, keyword/key-phase and surface structure matching, avoid steps to determine meaning by mapping responses to the actual collections of words that comprise a sentence (surface structure).

Those approaches that move toward deep structure, especially transformational grammar, almost always begin with parsing techniques. Computer-based parsing is as old as natural language processing (NLP) itself (for example, Green et al., 1961). In the simplest portrayal of this approach, human language is transformed in a manner analogous to drawing the sentence diagrams that children learn in school. And regardless of the specific parsing method used, parsing techniques begin by processing sentences to determine the parts of speech (POS) for each word, along with assigning a symbolic representation for word meaning. From there, transformational grammar approaches use rules sets to identify the syntactic structure of the processed communication by fitting it against recognized structures in a rule-based table, leading to the interpretation of the deep structure, i.e., its meaning.

Natural language processors using the parsing approach are characteristically large, complex, and generally require a great deal of processing power to operate. Originally there was considerable human overhead in the development and maintenance of such systems. One trend for the last few decades has been to offset this human overhead by reverting to statistical language processing and other machine-learning approaches. While these approaches may not have explicit steps to determine the deep structure i.e., meaning of the language being processed, they do operate with the assumption that the underlying meaning of communication is driving the patterns that emerge in the solutions of these approaches.

The strength of parsing-based systems is that they permit a path for moving the symbolic representation of human language closer to its meaning, i.e., text or a form of surface structure closer to its organized semantic representations or deep structure (meaning). These systems, when they can process a natural language input, are among the most powerful and accurate techniques. For example, in the user input "Get me the phone number for Bob.", a parsing system can efficiently identify the action "get", the directionality implied by "me". the object "phone number", and the preposition "for" leaving the proper noun, "Bob", which a parsing system can easily use as an argument or parameter for searching a database without ever having seen this noun within the parsing tables before. This is possible because parsing systems can eliminate all things understood through their extensive processing, resulting in a low percentage of false positives, i.e., misidentification of meaning.

Unfortunately, the greatest weakness of parsing systems is their inefficient accommodation of users' variability of expression. There are thousands of ways that, for example, a user might ask for a phone number, and parsing-based systems are not very efficient or even capable of accepting the breadth of different users' unique expressions. Steven Pinker (1994) reminds us that Chomsky observed: "virtually every sentence that a person utters or understands is a brand-new combination of words, appearing for the first time in the history of the universe." As parsing systems accommodate how a concept may be expressed, the expressions of a concept may increase markedly in size (for example, depending on whether the expression is spoken words or found in a technical article) and in processing power required for operation of the parsing system along with increases in human-overhead in the production and maintenance of the system.

Besides difficulties arising out of variability of expression, the probability of accurately processing sentences decreases as sentences increase in length. While most parsing approaches can easily understand: "Get me the phone number for Bob.", it is doubtful that very many parsing systems could interpret "Given that I might have to call Bob later on, I would like you to get me his number so I'll have it if I need it." In as much as the statistical language processing enthusiasts want to believe that we have moved beyond Chomskyan grammar, the reminders that we have not are forever standing before us in the form of every complex sentence we encounter.

And, it is not just that the prior example was difficult to process because it contained an uncommon way of asking for a phone number. For parsing systems, sentence length itself is positively correlated with both syntactic complexity and variability of expression. That means that as sentences increase in length, the parsing systems lose functionality.

For example, the sentence, "Darwin's theory of evolution is supported by scientific evidence." can probably be processed by high-end parsing systems. The sentence, "Darwinian evolution has been overwhelmingly supported by studies of fossil evidence, genetic similarities among species, physical similarities among species, and even studies of how species change over brief time periods in response to environmental conditions.", would be difficult for almost any known parsing system to process.

The average sentence length in a phone conversation hovers around seven words in a sentence, while the average sentence length of a college textbook, however, is often above twenty words a sentence. But it is not just sentence length that presents challenges for parsing systems. While phone conversations may promise shorter sentence lengths than formal text such as that in journal articles, transcripts of phone conversations usually contain many grammatically incorrect sentences, incomplete sentences, and pronoun references that are difficult for parsing systems to unravel.

The point is, had parsing-based systems performed adequately over the last half-century, there would have been little need to develop other approaches to processing natural language. Many modern approaches are specifically designed to avoid the step of converting surface structure to deep structure. And while we have repeatedly seen that progress with natural language systems falters at the point where the surface structure of communication must be reduced to its deep structure, it is only that by performing this step we can identify semantic equivalency between phrases and thereby consider a more efficient creation of knowledge-based systems. Without semantic representation, which provides the ability to recognize semantic equivalency, e.g. a car is equivalent to an automobile, a sedan, a ride, etc., we will always have a "false positive" problem. While we have seen many knowledge-based systems described as semantic-based, the truth is, these systems are usually represented as surface structures. And, as a result, the inherent problem of establishing semantic equivalencies remains in our attempts to process human language via computers.

Even within the parsing approach, numerous attempts at innovation have been developed: CKY Parsers, Dependency Link Parsers, and Common Cover Link Parsers, to name a few. This would not be going on had parsing lived up to the original expectations first expressed by the fathers of artificial intelligence from the late 1950s to 1970 when so many believed that analyzing human language would prove to be a trivial task for artificial intelligence (AI).

A new approach is warranted. Perhaps we should attack this problem more closely from the perspective of cognitive science rather than from the machine-learning techniques so many are quick to employ today. For example, several journal articles in the last few years' have indicated that both word frequency (how many times a word appears in a corpus) and word function (for example, part of speech: preposition, article, noun, etc.) play a major part in how we learn language (Gervain et al., 2013) and may even aid in how we learn to break language into phrases. Given these findings, the inventors wondered if there was a way that would allow us to step over parsing individual words and move directly to the identification of high-frequency phrases. And, more important, once having found such a way, would the resulting list of unique high-frequency phrases be both small compared to the total number of phrases while accounting for a rather large percentage of human language. Because, if the resulting list of phrases met both requirements, that would indicate that we could pre-encode those phrases for semantic content and move human communication from surface structure to deep structure far more efficiently than ever before.

But when we talk about "phrases," as used herein, we are not referring to the currently popular n-gram lists that are the result of statistical analyses of text that uncover chains of words frequently occurring together (n-grams). The belief that the true meaning of human language can be derived n-grams is a seductive yet winding path to an imperfect solution. We know this because the relationship between n-grams and properly parsed phrases is sketchy at best. Today just about any large collection of text (corpus) created for analysis such as text dumps of Wikipedia and Google Books are accompanied with n-gram tables of that text. In many corpus analyses, the resulting n-gram lists do not just contain phrases that are recognized as linguistically complete e.g., noun phrases, prepositional phrases, etc., but also partial phrases, and often fragments of two phrase combinations. These partial phrases and two phrase fragments may make up well over half of the n-gram list. For example, Table 1 below contains a sample of 36 n-grams from an alphabetized n-gram list from the Corpus of American English (COCA) which contains over 560 million words of text from a wide variety of sources.

TABLE 1

36 n-grams from an alphabetized n-gram list derived from a large popular corpus

| influence a | influence has | influence of alcohol |
| Influence among | influence has been | influence of drugs |
| Influence an | influence his | influence of his |
| Influence and | influence how | influence of the |
| Influence as | influence in | influence of these |
| Influence at | influence in the | influence on |
| Influence behavior | influence in the region | influence on a |
| Influence by | influence is | influence on his |
| Influence can | Influence it | Influence on me |
| Influence for | Influence its | Influence on our |
| Influence from | Influence of | Influence on the |
| Influence from the | influence of a | influence on their |

There are not very many n-grams in these 36 samples that could be characterized as syntactically complete phrases. About one-third of the n-gram phrases end with a preposition while another one-third end with an article or a possessive pronoun. N-gram lists are not highly correlated with how we understand sentences are broken into phrases. In other words, while n-grams are identifiable, the very fact that many n-grams are incomplete phrases, using them for language understanding would require a lot of post-processing. The inventors were not looking for a process that would yield results such as those produced by n-gram analyses. But rather, a problem we solve is the development of an efficient process to generate phrases that matches the hypothetical result of sentences diagrammed by a high school English teacher, i.e., phrases that were linguistically complete.

Terms of the Field Defined as Used Herein

We now define several terms of the technical field whose definitions shall apply to all such terms as found in the specification and the claims:

Corpus—a collection of human language examples from a source such as movie scripts or newspaper articles for use in the analysis of language. A set of corpuses are often referred to as a corpora.

Dictionary—refers to a dictionary as it is used in Python programming. That is to say, a dictionary is an associative-array hash table containing two lists of equal length where each element from one list (the key) is associated with an element (the value) on the other list.

Tokenize—refers to sentence tokenizing as is practiced in text analysis where paragraphs of text in a file or a variable are reorganized to contain one sentence per line.

Phrase—a group of words (or possibly a single word) that functions as a constituent in the syntax of a sentence, a single unit within a grammatical hierarchy, e.g., noun phrases, verb phrases, and prepositional phrases.

Partial Phrase—a group of words (or possibly a single word) that would function as a constituent in the syntax of a sentence as a phrase with the exception that it is missing the last word or words, e.g., partial noun phrases, partial verb phrases, and partial prepositional phrases.

Phrase-Chain—a group (or chain) of phrases that frequently occur in a particular order such as noun phrase—verb phrase combinations, verb phrase—noun phrase combinations, and verb phrase—prepositional phrase combinations. The phrases in a phrase-chain can be full (complete phrases) or partial (partial phrases). When used in the plural, phrase-chain herein reads as phrase chains.

Partitioning File—a text file containing multiple lines of one word and one code per line. The contents of the partitioning file are used to create the partitioning dictionary.

Partitioning Dictionary—A dictionary used by a tumbling-frequency algorithm to partition sentences into phrase chains. The dictionary contains high-frequency words (as keys) along with their word use frequency rank (as values). In later iterations, that frequency rank is also weighted by word function. And this weighted value evolved to a simple integer encoding.

Phrase-Chain File—a text file containing multiple lines containing one phrase-chain, one vector of syntactic/semantic encodings for each word in the phrase-chain, and the frequency count for the occurrence of the phrase-chain in the corpora tested, on a single delimited line for each phrase-chain in the file. The contents of the phrase-chain file are used to create the phrase-chain dictionary.

Phrase-Chain Dictionary—A dictionary used by a tumbling-frequency algorithm to identify phrase chains and their associated syntactic/semantic encoding. The dictionary contains the phrase chains (as keys) along with their associated syntactic/semantic encoding (as values). The frequency of occurrence associated with a particular phrase-chain in the phrase-chain file is not read in.

SUMMARY OF EMBODIMENTS OF THE INVENTION

The present disclosure relates to natural language understanding. We have created a process that can effortlessly, quickly, and accurately break natural language into phrase chains as defined above. Then and more important, we have discovered that a small and finite set of these "phrase-chains" created using this process account for a considerable percentage of human language. The significance of this result is that, since we are dealing with a finite list of phrase chains, these phrase chains, once identified, can be pre-encoded for meaning (sometimes referred to herein as deep structure), allowing for simpler, faster, and more accurate natural language processing at a semantic level than any parsing approach described before. The Bibliography at the end of the detailed description of the embodiments of our tumbling-frequency phrase-chain parser summarizes the prior art literature directed at prior art natural language processors and each reference of the Bibliography is incorporated herein by reference in its entirety as a Background for embodiments of a tumbling frequency phrase-chain parser of the present invention.

DETAILED DESCRIPTION OF EMBODIMENTS OF THE INVENTION

Figure 1:
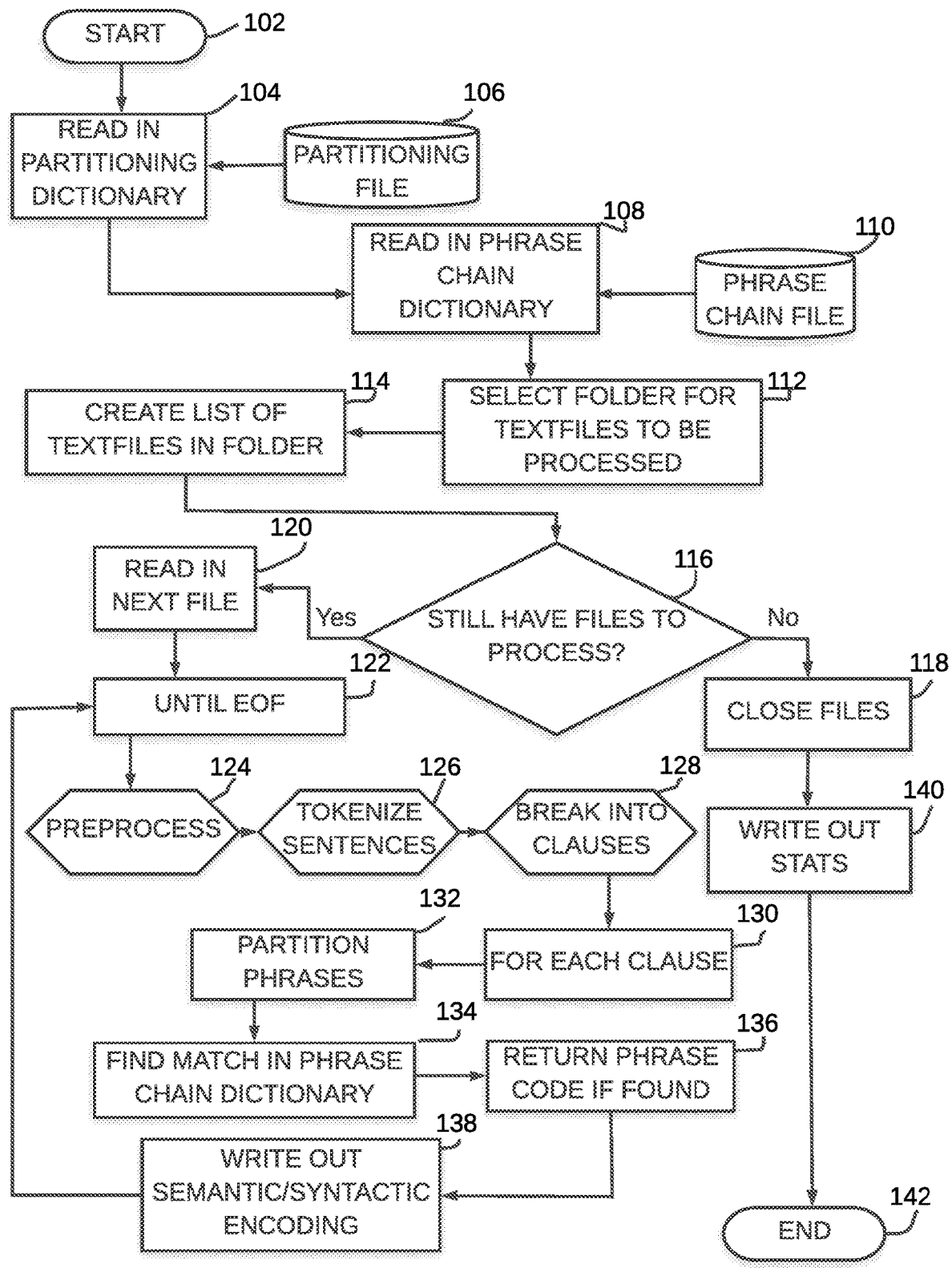
FIG. 1 illustrates a flowchart of an embodiment of a Tumbling-Frequency Phrase-Chain Parser software algorithm for use at a cloud, server, client of server client of a client authenticated in the hierarchy of cloud, server, client of server and client of a client.

Before explaining at least one embodiment of the present invention, it must be stated that this invention is not limited in its application to the arrangements of the components or process steps in the following description or illustrated in the drawings. The invention is capable of other embodiments and of being practiced and carried out in various ways. Also, it should be understood that the phraseology and terminology employed are for the purpose of description and should not be regarded as limiting. But the terms of the field as defined above should assist in an appreciation of the scope and the claims to the embodiments of the invention.

The aspects, advantages and/or other features of example embodiments of the invention will become apparent in view of the following detailed description, taken in conjunction with the accompanying drawings. It should be apparent to those skilled in the art that the described embodiments of the present invention provided herein are merely exemplary and illustrative and not limiting. Numerous embodiments of modifications thereof are contemplated as falling within the scope of the present invention and equivalents thereto. Any publications, patent applications, patents, and other references mentioned herein are incorporated by reference in their entirety.

Of the four primary approaches to processing language by a computer, only the present parsing approach considers the semantic and syntactic components in the initial steps. In doing so, however, the required resources expand rapidly as the scope of the language processed increases, and as that scope increases, the performance of parsing systems decreases. This disclosure, however, describes a methodology for understanding natural language that leaps over the word-by-word parsing steps by using a list of patterns, weighted and encoded based on both word function and frequency, to segment natural language sentences into phrases, partial phrases, and phrase chains, in particular, comprising a finite list of such phrase chains.

The impetus for the embodiments of the invention disclosed herein was a trend observed by the inventors where a word's rank on a frequency-of-use table was positively correlated with the position of a word in a phrase in a sentence. That is to say; it was observed that within a phrase, the ranking of a word with a phrase appeared to usually be lower that the ranking of a word before it, and when a higher ranked word was seen following another word, it generally indicated the start of a new phrase. In noun phrases, for example, the articles and possessive pronouns that often begin a noun phrase have a frequency of use rank higher than adjectives, and adjectives have a frequency of use rank generally higher than the nouns. Based on this observation of word rankings seeming to "tumble" down and "tumble" up and then down again in a text file as one steps from word to word along a sentence, the inventors first determined to test if sentences might be correctly divided into their constituent phrases by merely processing the word frequency rankings for each word in a sentence.

Development of the Tumbling-Frequency Phrase-Chain Parser Algorithm

Development for the algorithm of an embodiment of the invention directed to a tumbling-frequency phrase-chain parser occurred in three primary areas. The first area dealt with efforts in choosing the particular method for processing sentences. The second area was related to structuring and testing the weighted list (by function and by frequency) used for partitioning phrases. And the third area was related to the construction, encoding, and testing of the different size lists result from running the algorithm on corpora (more than one corpus). We will discuss these in turn.

Three primary methods developed for the first area, processing sentences into phrases, are presented below. While these methods differ in performance and implementation, we include all three methods below because all are viable in the parsing of sentences into phrases.

Partitioning Method One: Partitioning a Sentence into Phrases Based on Word Frequency Ranking.

To test an approach based on word frequency, a corpus consisting of 8000 movie scripts, 70 textbooks, and 5 million sentences of Wikipedia, and 7 million lines from TV scripts was used. This corpus contained over 22 million sentences containing 206 million words.

This test of an approach based on word frequency resulted in the accurate partitioning of sentences into phrases (files) at well above 80%. The results were acceptable, yet one consistent fault occurred with the processing of prepositions. Most prepositions have a word frequency ranking below articles and possessive pronouns. That means that usually prepositions will not be joined with the noun phrases that follow in the partitioning of sentences.

For example, when we take the sentence "If the results are governed by the laws of probability, these numbers should not exceed certain limits." and partition it into phrases based on a tumbling-frequency algorithm, the example sentence is correctly partitioned into phrases except for one stranded preposition, "by" in "by the laws of probability." The example sentence is shown below followed by a line containing the word frequency ranks for each word in the sentence used by the algorithm to partition that sentence into phrases. For example the word "If" was rank 40$^{th}$ on the word frequency rank list, "the" was ranked 1$^{st}$, the word "results" had a frequency rank below 5000 (>5000), "are" was ranked 8$^{th}$, and so on. The extend to which a word frequency ranked below 5000 was irrelevant to our algorithm and therefore we classified all such rankings as the same.

"If the results are governed by the laws of probability these numbers should not exceed certain limits."

tion would be treated as a binding word, and the noun phrases that followed could stand on their own. In the other solution, the word frequency could be weighted based on word function resulting in placing prepositions at a higher rank than articles. Either solution would have yielded the same results and those results were acceptable. To avoid postprocessing, however, the second solution was adopted.

This test, based on word frequency and weighted by word function, resulted in the accurate partitioning of sentences into phrases at about 90% (better than 80% for Method One). The results were acceptable, but yet again, we noticed a small anomaly in the phrases created by our process. Approximately 5% to 6% of the identified high frequency phrases were chains of two and sometimes three phrases, e.g., "is president" and "he received news". To rectify this, we developed a post-processing step that removes phrase chains from our list and ensures that the component phrases that make up the phrase chains were on the high-frequency chain list.

Partitioning Method Three: Partitioning a Sentence into Phrase Chains Based on Word Frequency Weighted by Word Function.

When we arrived at the step for semantically and syntactically encoding the phrase list (described later), we realized there was no reason to avoid the phrase chains eliminated through post-processing in the second method since the result would be the same whether we performed this step or not. That is to say, the two phrase chains we separated through post-processing appeared together again when we looked at the semantic-syntactic encoding for the sentences in whole. Ultimately, accepting these phrase chains would allow for some small gains in processing speed but, more significantly, doing so would reduce errors in semantic/syntactic encoding. This test resulted in the accurate partitioning of sentences into phrase chains (defined above) that accounted for 94% of the words in the 22 million sentences. The results were acceptable (even better than 90%).

Other Developmental Efforts

While work was going on in developing the partitioning algorithm, there was also an effort underway to determine the most viable approach to weighting a partitioning dictionary (FIG. 1, step 104) i.e., the high-frequency words to be processed in analyzing the corpus sentences. This list existed in a dictionary form, where a word was looked up, and having been found, a numeric value associated with that word was passed back to the algorithm to be used in the tumbling frequency process. Several approaches were used to find the optimal method of breaking language into its appropriate phrases. Initially, this number was purely based off of an index from a frequency of use, or a ranking associated with each word. The current partitioning dictionary contains just under 9000 entries with the frequency ranks weighted by word function associated with each rank, rounded to the nearest integer. This partitioning dictionary continues to be optimized for performance.

---

40  1  >5000  8  >5000    30  1  >5000 4  >5000    82  >5000   121
2929 3308   578   >5000

---

Partitioning Method Two: Partitioning a Sentence into Phrases Based on Word Frequency Weighted by Word Function.

Two possible solutions were devised to handle the "stranded preposition" scenario. In one solution a preposi- The third area of development was related to the construction, encoding, and testing of the different size phrase lists that resulted from running the algorithm on the corpora. The initial list contained about 100,000 unique phrases listed with the frequency-of-use of the phrase in the corpora. We were concerned about losses and processing speed as the list increased. During our testing, we created over 100 of these lists of different sizes. We eventually discovered that the list size was having little impact on processing time. So our concern was not founded in actuality. The most extensive list we used contained about 4.5 million phrases. We finally settled on a list containing 2.4 million phrases. To gain an indication of the completeness of the phrase lists, occurrences of a test sample of strings were counted on the lists. For example, the string "patent" appeared 22 times on the list with 240,000 entries and 602 times on the list with 2.4 million entries.

The Table 2 below provides a sample of 50 entries from the 602 entries containing the string "patent" on the list with 2.4 million entries.

TABLE 2

A sample of 50 phrases from the 602 entries found to contain the string "patent" from the complete corpus

| | |
|---|---|
| the patentee | by the european patent office |
| its patent | specification patent license |
| of its patents | has been patented |
| patent rights | he also registered several patents |
| not patented | an international multi-patent holder |
| their patent | the patenting |
| of the united states patent | over patents |
| under the european patent convention | has patented |
| patent infringement | for patent protection |
| by patent ochsner | patent application |
| on patents related | design patents |
| of patent applications | for patent claims |
| in patents | for the patent |
| by the united states patent | as patents |
| the patent application | any patents held |
| the patent expired | a land patent |
| of the patent act | the european patent convention |
| other patents | patent troll |
| which of the patents | on a patent |
| of the european patent organization | on the patents |
| of his patent | for patenting |
| a patent attorney | a european patent |
| of his patents | the patentability |
| in the letters patent | of patent infringement |
| in a patent | the european patent office |

The next step in the development was to programmatically assign syntactic/semantic encodings for the phrases on the 2.4 million entry phrase list. Table 3 below illustrates an embodiment of a sample of 25 items from the 2.4 million encoded phrase-chains encoded in the phrase-chain table. The syntactic/semantic encoding appears in the third column.

TABLE 3

A sample of 25 phrases from the 2.4 million entries encoded in the Phrase-Chain Table

| | | |
|---|---|---|
| 170 | above the waves | %229 a04 v30180 |
| 49 | above the waters | %229 a04 n001037 |
| 44 | above the water's surface | %229 a04 m01037 v00422 |
| 596 | above the waterline | %229 a04 0120085 |
| 31 | above the waterfall | %229 a04 oil 7802 |
| 1124 | above the water | %229 a04 o01037 |
| 72 | above the water table | %229 a04 o01037 o001431 |
| 117 | above the water surface | %229 a04 o01037 v00422 |
| 209 | above the water line | %229 a04 o01037 o005055 |
| 166 | above the water level | %229 a04 o01037 v00654 |
| 151 | above the war fronts | %229 a04 0005844 n005017 |
| 26 | above the walls | %229 a04 v32060 |
| 32 | above the wall | %229 a04 v02060 |
| 214 | above the waist | %229 a04 000719 |
| 194 | above the vowel | %229 a04 0110543 |

TABLE 3-continued

A sample of 25 phrases from the 2.4 million entries encoded in the Phrase-Chain Table

| | | |
|---|---|---|
| 24 | above the voltage | %229 a04 *111090 |
| 25 | above the volcano | %229 a04 0110540 |
| 23 | above the villages | %229 a04 n005269 |
| 1044 | above the village | %229 a04 o005269 |
| 22 | above the vault | %229 a04 v00677 |
| 40 | above the value | %229 a04 v00312 |
| 24 | above the valleys | %229 a04 n001653 |
| 248 | above the valley | %229 a04 o001653 |
| 176 | above the valley floor | %229 a04 o001653 o002842 |
| 22 | above the upper wing | %229 a04 j01775 o005821 |

The first column of the above Table of 25 phrases from the 2.4 million entries encoded in the Phrase-Chain Table all beginning with the word "above" represents the raw frequency of that phrase's occurrence in the corpora, the second column represents the phrase-chain (surface structure), and the third column, as briefly discussed above, represents the semantic/syntactic encoding for the phrase-chain in the second column. The each semantic/syntactic encoding for each word in the phrase-chain is made up of two components. The first character (or symbol) of the encoding represents the part of speech, for example, the symbol "%" for preposition, the letter "a" for article, and the letter "j" for adjective. The semantic/syntactic encoding represents an assigned part of speech to a word and further includes v, n, m, o, and asterisk *. The use of these characters or symbols is arbitrary but is performed consistently even if a particular word may be a noun or a verb, its character or symbol is consistently used as one or the other. The remaining numeric portion of the encoding represents the semantic encoding for the word, for example, "229" for "above", "04" for "the", and "01775" for "upper".

The next step in the development was to create the Phrase-Chain Parser Program (FIG. 1). That program uses the partitioning file (106) and 2.4 million phrase chains with the semantic/syntactic encodings found in the phrase-chain file (110), to process sentences from a test corpus.

Referring to FIG. 1, FIG. 1 shows the flow chart steps required to process text through the Tumbling Frequency Phrase-Chain Parser. The process begins at Start (102) with read in partitioning dictionary (104) from the partitioning file (106) containing the word, as a text string, and an associated weighted-frequency rank for each item on the list. The word/weighted frequency rank pair constitutes a single item in the partitioning dictionary (104). This read-in process continues until all of the lines in the text file are processed and represented in the partitioning dictionary. In the next step, the phrase-chain text file (110) is read into the phrase-chain dictionary (108) for each item on the list. That text file containing the phrase-chain, defined above, as a text string, has associated semantic/syntactic encoding for each item on the list. The phrase—semantic/syntactic encoding constitute a single item in the phrase-chain dictionary. This process continues until all of the lines in the phrase-chain file are processed.

In the next step, the folder containing the text files for the corpus is identified (112). From this folder, a list of text files in the folder is created (114). This list will be used to select, open, read-in, and close each text file as it is processed. Each line of the file is read in until an end-of-file tag is encountered.

As each line of a natural language speech or writing is brought in, it is taken through a preprocessing step (124) where special characters may be removed. Then the total collection of lines is moved through a sentence tokenizer (126) for extracting sentences from the lines. At this point we are now working with sentences instead of lines of text.

Each tokenized sentence is broken into clauses based on punctuation (128). And, for each clause, the words are partitioned into phrases (132) using the partitioning dictionary. At that point, each phrase is matched on the phrase-chain dictionary (134) and the associated semantic/syntactic codes are collected. The complete sentence is broken into phrases and paired with a semantic/syntactic code, and this pairing is then written out (136) to the resulting file (138). The process is continued until all lines in all files in the selected folder have been processed (118).

The final version of the Tumbling-Frequency phrase-chain parser program contained about 140 lines of code (about 100 with blank lines and comments removed). That program is included in Appendix A. Appendix A represents the source code for the Flowchart shown in FIG. 1. Appendix A is subject to copyright: C William Randolph Ford 2018 and comprises 141 lines of code. The copyright owner, Mr. Ford, has no objection to the facsimile reproduction by anyone of the patent document or the patent disclosure, as it appears in the United States Patent and Trademark Office patent file or records, but otherwise reserves all copyrights whatsoever for the attached Appendix A or for the flowchart of FIG. 1. Appendix A is submitted after the Bibliography and before the claims and Abstract of the Disclosure.

Table 4 below shows the performance measures for that program and processing about 14 million sentences from a test corpus.

TABLE 4

Performance Measures for Tumbling-Frequency Phrase-Chain Parser run on a 14 million sentence Corpus Total words processed = 159,089,742
Total phrase chains found = 65,419,409
Total sentences processed = 14,621,497
Total processing time in seconds = 690.83
230,286.55 words per second.
21,164.99 sentences per second.

Figure 2:
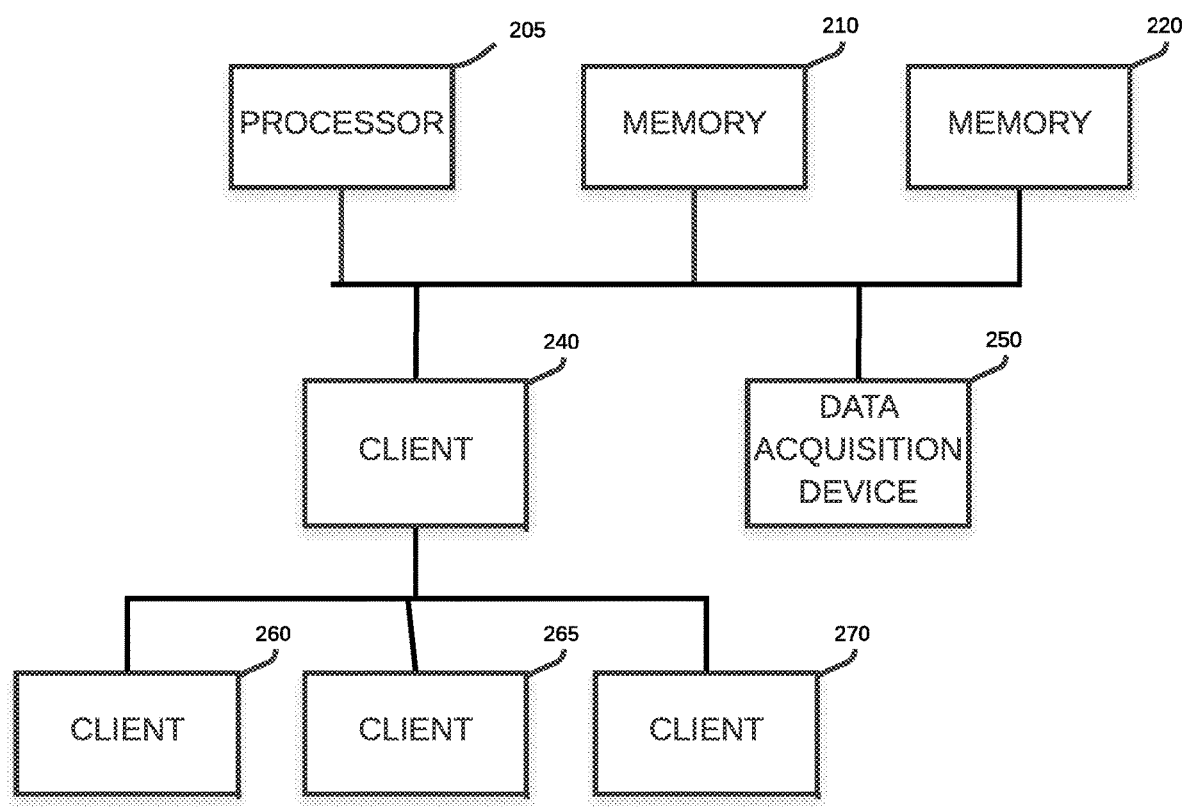
FIG. 2 is an exemplary diagram of special purpose data processing environments in which the exemplary aspects of the present disclosure may be implemented where a cloud is not shown, nor a server, but are well known in the art.

Referring now to FIG. 2, this test was performed on a Dell Precision M5510 Laptop with an Intel QuadCore i7 processor with a speed of 2.7 GHz, 32 gigabytes of RAM and a 1 TB SSD hard drive on a single processor thread. FIG. 2 shows a known processor (205) programmed by a special purpose parsing program (software) per FIG. 1 and Appendix A code stored in at least memory (210) and a storage (220) which is preferably local but may be in the "cloud" or a "server." For example, a natural language processor collection of files (110) may be located in storage (220) and the partitioning file may be an input file input through data acquisition device (250) and stored in at least either memory (210) or storage (220). There may be more than one client processor (240) having an input device (not shown) such as a real or virtual keyboard, a mouse or other known selection device such as a cursor and click pad. Output devices may comprise a display or an output of semantic/syntactic coding provided by a printer. Not shown are authenticated wireless communication devices for communication with the cloud or a remote database. The present parsing software may be run as described by FIG. 1, for example, on practically any typical personal computer having a special purpose parser programmed natural language processor of the present invention using tumbling frequency phrase-chain parsing. The 230286 words processed per second output of the Dell laptop represents a thirty times improvement in speed over the highest processing times we timed (see U.S. Pat. No. 9,720,903B2 chosen as a state-of-the-art parser). Also, this test resulting in a thirty times improvement was performed in Python, a scripted language. It would be reasonable to expect to see considerable time improvements if this algorithm were run in a compiled language. And, in fact, when we ran the Python script through PyPy, a Python JIT compiler, the program ran at over 150,000 sentences a second as opposed to the 21,164 sentences per second reported above. To provide some perspective, that means that a compiled version of the parsing software can process Tolstoy's "War and Peace" (containing 587,287 words) on a laptop computer, using just one of the four processing cores, in less than a single second. Once we saw the program's high-performance level, we spent little time or effort attempting to further improve performance speed. For example, we could have combined the test files into larger files, reducing the total time taken to read files.

FIG. 2 is an exemplary data processor (205) that may be used as an embodiment of the present invention made for the special purpose of using tumbling-frequency phrase-chain based parsing.

Referring again to FIG. 2, by way of example, system components will now be discussed. Referring to FIG. 2, the system supporting databases and prediction of properties of objects has at least one processor (205), but may have more than one processor, and the processor may implement more than one processor core. Any special purpose computer code of the present embodiments may be located in the "cloud" (not shown) and be accessed (downloaded) by servers (not shown) and, further be accessed from the cloud or a server by client devices and by client devices connected to client devices. The processor has access to memory (210), (220) which is used to store index and store word structures that enable rapid access to stored phrases that have similarities to the attributes of a chain of phrases specified in an input from a data accessing device (250). Storage (210), (220) is utilized to provide persistent or temporary memory and to serve as a repository for information that does not need to be accessed as efficiently (rapidly) as the in-memory phrases. It is implicit to note forms of the cloud that, for example, a user, password and changing two step authentication, may be used to access the cloud software. Similarly, a server may require two step authentication as may a client or processor or client of a processor and a client may access a data acquisition device by a network or a bus system. For example, images of the software may reside in storage (210) while descriptions of the shapes of segments of natural language or other attributes of the natural language may reside in memory (210), (220). One or more clients (260), (265), (270) can submit queries to the server's software, which are interpreted by the processor 205 in order to perform searches using the phrase chains that are resident in memory 220 and, possibly, the data contained in the storage (210). NLP results are returned by the processor (205) to the clients (260), (265), (270) via a network (wired or wireless). Users can interact with the system through the client(s) (260), (265), (270) using input devices such as a keyboard and mouse and output devices such as a display or printer. All of the components may be implemented in a single computer system such as a laptop, desktop, server cloud server or they may be implemented in separate computers that interact using a communications medium such as a wired or wireless network using two step authentication.

A data acquisition device (250) may be connected to either a client (260), (265), (270) or a server or the cloud using an interface such as a serial interface, Ethernet, a data acquisition and control card, a universal serial bus (USB), or a FireWire bus or network (wireless of wired). Example data acquisition devices include scanners, microscopes (optical, electron, or confocal), cameras (still image or video), antennas, infrared sensors, acoustic sensors, laser rangefinders or scanners, and spectroscopic instrumentation or related field portable devices such as a device for detecting energetic particles. A data acquisition device (250) may receive unprocessed natural language to be processes by the cloud, a server, a client or a client of a client. The interface to the data acquisition device (250) may be bi-directional, meaning that the server or client can control the operation of the data acquisition device (250) to, for example, locate and examine portions of natural language that are subject to analysis. The data acquisition device (250) may utilize a wireless, wired, acoustic, or optical communications link to control a remote device and/or acquire information from a remote device, for example, such as a book player playing a recording of a novel.

In the largest corpus we tested (which contained a complete English version of Wikipedia in addition to 8000 movie scripts, 70 textbooks, and 7 million lines from TV scripts), we observed per Table 5:

TABLE 5

Performance Measures for Tumbling-Frequency Phrase-Chain Parser run on a 233 million sentence Corpus Total words processed = 3,786,526,491
Total phrase chains found = 1,418,612,857
Total sentences processed = 233,464,325
Total processing time in seconds = 11801.11
320,861,91 words per second.
19783.25 sentences per second.

You will note that the number of sentences per second decreased in this test, while the number of words per second increased. This can be attributed to the longer sentence lengths seen in Wikipedia as compared to textbooks and movie scripts.

Table 6 illustrates an embodiment of a sample of processed sentences broken into phrase chains and semantically encoded. The symbol "°" is used here to demarcate how each sentence was broken into phrase chains by the program.

TABLE 6

A sample of processed sentences broken into phrase chains with the syntactic/semantic encoding for each word on the next line.

the state constable training program ° is regulated ° by sled ° and ° established ° by the sc law enforcement training council °
a04 o109660 d13157 v10092 -v02874 ° ^3 v20733 ° %013 o167761 ° con-105 ° v20153 ° %013 a04 d09940 o001461 o004319 v10092 o005141 °
courses ° are presented ° by the south carolina criminal justice academy instructors ° and ° certified law enforcement instructors °
n001224 ° ^2 v22432 ° %013 a04 *719301 s0917 e02635 o192347 o005077 n004298 con-105 ° v22165 o001461 o004319 n004298 °
both manuals ° are generated ° by the sc criminal justice academy ° and ° are approved ° by sled °
a34 n00066 ° ^2 v22365 ° %013 a04 d09940 e02635 o192347 o005077 ° }1105 ° ^2 v22269 ° %013 o167761 °
basic constable ° and ° advanced constable certification testing ° are administered ° at the south carolina criminal justice academy 0
j01815 d13157 ° con-105 ° v22241 d13157 o001562 v12526 ° ^2 ° v20896 ° %101 a04 *719301 s0917 e02635 o192347 o005077 °
they may also serve ° under other conditions ° as approved ° by the chief ° of sled °
pro-180 x16 b03275 v02519 ° %091 a12 n006266 ° %041 v22269 ° %013 a04 d06358 ° %019 o167761 °
many types ° of law enforcement officers ° have been created ° with titles ° throughout history °
j03065 n000015 ° %019 o001461 o004319 n005255 ° >0 ^4 v22300 ° %040 n117349 ° %029 o114425 °

To demonstrate that longer sentences encountered by our parser do not present the same problems as they do for other parsing systems, we have included the 48 word sentence "Also, in this set of changes, coroners, who were elected judicial death investigators, were generally replaced by medical examiners, who were required to be a medical doctor, osteopathic physician, dentist, lawyer, or, veterinarian in the new system, though coroner still exists on the books in many NC counties." correctly broken by our special purpose processor into seventeen phrases (below) followed by the syntactic/semantic encoding for the same sentence.

also ° in this set ° of changes ° coroners ° who were elected judicial death investigators ° were generally replaced ° by medical examiners ° who were required ° to be a medical doctor ° osteopathic physician ° dentist ° lawyer ° or ° veterinarian ° in the new system ° though coroner still exists ° on the books ° in many nc counties °
b03275° %207 a07 v02929 ° %019 v32850 ° n107895 ° @10 ^8 v20128 j02007 o006039 n108830 °^8b01209 v22482 °%013 j01979 n183320 °@10 ^8 v22485 °%030 ^0 a06 j01979 prf-151 °j26681 e00187°e0348 °e00837 °}103 °e00933 °%207 a04 j01684 o00179 °%153 e00278 b01192 v32310 °%208 a04 n003211 °%207 j03065 *610013 n003046 °

Although the invention has been described in example embodiments and a tumbling-frequency phrase-chain parsing method disclosed, additional modifications and variations may be apparent to those skilled in the art. It is therefore to be understood that the inventions herein may be practiced other than as specifically described. For example, by replacing the chain of semantic codes for words for a phrase with a single semantic code for that phrase, this parser can be easily modified to function as a natural language processor. Such a modification could be performed by simply tagging the single semantic codes for each phrase as it fulfills its role within a subject-verb-object (SVO) structure and that SVO structure can be converted to a single semantic representation of the deep structure for a complete sentence or message.

Once the modification in the step above has been performed, the natural language processor created by following the above steps can be reversed to function as a natural language generator. In order to perform this task of a generator, one would need only to use frequency of particular phrase chains used to generate surface structure from deep structure (meaning).

Given the natural language processor and natural language generator described in the last two paragraphs above, these two inventions can be combined to perform language translation using these two processes to drive a surface structure down to deep structure in one language, and back from deep structure up to the surface structure in a second different language (for example, from English to Russian).

In addition to the three inventions described in the last three paragraphs, by taking the symbolic representation derived from the natural language processor, an additional invention of a semantic knowledge base can easily be constructed from those codes.

In addition to the four inventions described in the last four paragraphs, by using the frequency of occurrence of the phrases identified by the parser and used in the natural language processor, this invention from this methodology would involve changing the readability level of surface structures by using frequency of occurrence in the natural language generator of the second suggested invention.

In addition to the five inventions described in the last five paragraphs, we discovered that a collection of fewer than 300,000 partial phrases account for over 85% of the slightly less than 9 million phrases that account for 95% of all language found in our corpus of 2.4 million phrases. This finding confirms that a sixth new invention may comprise another parser, and natural language processing is possible based on using those high-frequency occurring partial phrases.

With respect to the rules assumed, the mathematical model used, the definitions and examples of tumbling frequency and phrase-chain, feedback data and related processes, the features useful and provided by a typical computer processor operating as a natural language process having an output, for example, and a keyboard and display screen, etc. Thus, the present embodiments should be considered in all respects as illustrative and not restrictive. Accordingly, it is intended that such changes and modifications fall within the present invention as defined by the claims appended hereto.

BIBLIOGRAPHY

Patent Citations (7)

1. U.S. Pat. No. 5,095,432A *1989-07-10 1992-03-10 Harris Corporation Data processing system implemented process and compiling technique for performing context-free parsing algorithm based on register vector grammar
2. US5926784A1997-07-17 1999-07-20 Microsoft Corporation Method and system for natural language parsing using podding
3. U.S. Pat. No. 5,930,746A *1996-03-20 1999-07-27 The Government Of SingaporeParsing and translating natural language sentences automatically
4. U.S. Pat. No. 6,108,620A 1997-07-17 2000-08-22 Microsoft Corporation Method and system for natural language parsing using chunking
5. U.S. Pat. No. 6,236,959B 11998-06-23 2001-05-22 Microsoft Corporation System and method for parsing a natural language input span using a candidate list to generate alternative nodes
6. U.S. Pat. No. 7,599,831B2 2003-03-14 2009-10-06 Sonum Tech Inc Multi-Stage pattern reduction for natural language processing
7. U.S. Pat. No. 9,720,903B2 *2017-08-19 2004-03-30 Robert D. New Method for parsing natural language text with simple links Non-Patent Citations (13)

1. Abney, S. "Parsing by Chunks" Principle-Based Parsing, R. Berwick, S. Abney, C. Tenny (eds.). Kluwer Academic Publishers., Nov. 10, 1994, pp. 1-18
2. Bobrow, D., Kaplan, R., Kay, M., Norman, D., Thompson, H. and Winograd, T. (1977) GUS, a frame driven dialog system. Artificial Intelligence, 8: 155-173.
3. Chomsky, N. Verbal Behavior. By B. F. Skinner. Language, 1959, 35, 26-58.
4. Farreras, I. G., & Ford, W. R. (2014, June). *The evolution of a discipline: How the semantics of introductory psychology textbooks have changed over the last century.* Paper presented at the 46$^{th}$ annual meeting of Cheiron: The International Society for the History of Behavioral and Social Sciences, Frederick, Md.
5. Ford, W. R., & Farreras, I. G. (2015, April) *Using a multi-stage pattern reduction NLP for syntactic analysis of unstructured data.* Paper presented at the 2015 Analytics Applications Summit, Harrisburg, Pa.
6. Gervain, J, et al. (2013) Word frequency cues word order in adults: cross-linguistic evidence, Front. Psychol., 02
7. Green, B. F., Wolf, A. K., Chomsky, C. and Laughery, K. (1961) BASEBALL: An automatic question answerer. Proceedings Western Joint Computer Conference 19, pp. 219-224.
8. Green, C. (1969) Theorem proving by resolution as a basis for question-answering systems. Machine Intelligence, 4: 183-205.
9. Hill, J. R., Ford, W. R., & Farreras, I. G. (2015). Real conversations with artificial intelligence: A comparison between human-human online conversations and human-chatbot conversations. *Computers in Human Behavior,* 49, 245-250.
10. Marcus, M., et al., "Building a Large Annotated Corpus of English: The Penn Treebank." Computational Linguistics, 1993, 19(2): 313-330.
11. Pinker, S. (1994). *The language instinct: The new science of language and mind.* London: Allen Lane, the Penguin Press.
12. Sowa, J., "Why has A.I. failed? And how can it succeed?" Computación y Sistemas 18:3, 2014, pp. 1-5.
13. Sowa, J., *Pursuing the Goal of Language Understanding.* Paper presented at the 2015 Analytics Applications Summit, Harrisburg, Pa.

APPENDIX A

©2018 William Randolph Ford

```
import os
import re
import codecs
import time
def findz(s, ch):
    return [i for i, ltr in enumerate(s) if ltr == ch]
megeelines = codecs.open("c:/Users/rand/Desktop/TumblerNLP/Desktop Textfiles/newbreakerlist.txt","r",encoding='utf-8')
occurred = { }
rmegeelines = megeelines.readlines( )
for j in rmegeelines:
    j = j.strip( )
    mj = j.split("\t")
    occurred[mj[1]] = int(mj[0])
megeelines.close( )
nlplines = codecs.open("c:/Users/rand/Desktop/TumblerNLP/Julianlp12.txt","r",encoding='utf8')
occurs = { }
rnlplines = nlplines.readlines( )
jayme = 0
for j in rnlplines:
    jayme = jayme + 1
    j = j.strip( )
    js = j.split("\t")
    occurs[js[0].lower( )] = js[1]
nlplines.close( )
print("number of NLP phrases = ",jayme)
#uttpath = "C:/Users/Rand/Desktop/TumblerNLP/Txt Corpora"
uttpath = "C:/Users/Rand/Desktop/TumblerNLP/lilwik"
doout = codecs.open("c:/Users/Rand/Desktop/dogout.txt","w",encoding="utf-8")
daout = codecs.open("c:/Users/Rand/Desktop/daout.txt","w",encoding="utf-8")
t1 = time.time( )
a = os.listdir(uttpath)
alldat = 0
allmot = 0
        numchains = 0
        for jjj in a:
         print(jjj)
         uttfile = uttpath + "/" + jjj
         if uttfile.endswith(".txt"):
            utter = codecs.open(uttfile, "r",encoding="utf-8")
            butter = utter.readlines( )
            endswith = ""
            alldat = alldat + len(butter)
            print(alldat)
            for j in butter:
                if j > " "
                    j = re.sub(r"[.?!]","",j)
                    j = j.replace("","")
                    j = j.replace("â€","—")
                    j = re.sub(r"[:=;.|( ){ },]","°",j)
                    j = j.replace("[","°")
                    j = j.replace("]","°")
                    j = j.strip( )
                    sj = j.split("°")
                kimmie = "
                jimmie = "
                for esj in sj:
                    esj = esj.strip( )
                    jsplit = esj.split(" ")
                    allmot = allmot + len(jsplit)
                    oldmem = 0
                    jkjs = ""
                    sponge = ""
                    for jkj in jsplit:
                        jkj = jkj.strip( )
                        if jkj > " ":
                            mem = occurred.get(jkj.lower( ),99)
                            sponge = sponge + "" + str(mem)
                            if mem == 1:
                                jkjs = jkjs + "°" + jkj + "°"
                            elif mem < oldmem:
                                jkjs = jkjs + "°" + jkj
                            else:
                                jkjs = jkjs + " " + jkj
                            oldmem = mem
                    jkjs = jkjs.strip( )
                    sjkjs = jkjs.split("°")
```

APPENDIX A-continued

©2018 William Randolph Ford

```
            women = ""
            wasgood = ""
            for nowgood in sjkjs:
                    nowgood = nowgood.strip( )
                    if nowgood > "":
                        nowgood = nowgood.lower( )
                        men = occurs.get(nowgood.lower( ),"99999")
                        if (men == "99999"):
                          if nowgood[0].isalpha( ):
                                zimmie = nowgood.split( )
                                gimmie = ""
                                for m in zimmie:
                                    gimmie = gimmie + occurs.get(m,"99999") +" "
                                gimmie = gimmie.strip( )
                                if "99999" in gimmie:
                                    daout.write(nowgood + "\n" + gimmie + "\n\n")
                                women = women + gimmie + " ° "
                                wasgood = wasgood + nowgood + " ° "
                        else:
                                women = women + men + "°"
                                wasgood = wasgood + nowgood + " ° "
                    kimmie = kimmie + wasgood +" "
                    Jimmie = jimmie + women + " "
            if kimmie.strip( ) > "":
                    numchains = numchains + kimmie.count("°")
                    doout.write(kimmie + "\n" + jimmie + "\n\n")
t2 =time.time( )
t3 =t2−t1
print("Total words processed = ", allmot)
print("Total phrase chains found = ", numchains)
print("Total sentences processed = ", alldat)
print("Total processing time = ", t3)
print(allmot/t3," words per second.")
print(alldat/t3," sentences per second.")
doout.close( )
```

What we claim is:

1. Apparatus comprising a special purpose computer natural language processor using tumbling-frequency phrase-chain parsing, the natural language processor apparatus comprising a partitioning text file of a corpus to be read into a partitioning dictionary, the partitioning text file of the corpus for partitioning into sentences and the sentences for partitioning into phrase-chains responsive to a tumbling-frequency phrase chain parsing algorithm of a special purpose natural language processor, the partitioning dictionary for receiving the phrase-chain using word frequency ranking by word function comprising article, adjective, noun and verb into memory of the special purpose natural language processor, a phrase-chain dictionary, the phrase-chain dictionary responsive to the special purpose natural language processor for encoding the phrase-chains into syntactic/semantic encoding for storage in the memory of the special purpose natural language processor with a frequency rank weighted by word function responsive to the tumbling-frequency phrase chain parsing algorithm of the special purpose natural language processor, the special purpose natural language computer processor repeatedly selecting text files of the corpus to be processed until all text files of the corpus are processed and stored in the partitioning directory responsive to the tumbling-frequency phrase-chain parsing algorithm of the special purpose natural language processor;

for a sentence having a subject-verb-object structure, semantic coding for words of a phrase-chain being replaced by the tumbling-frequency phrase-chain parsing algorithm with a single semantic code for the words of the phrase-chain by tagging the single semantic code fort the phrase-chain, and the sentence having the subject-verb-object structure being converted to a single semantic representation of a deep structure of the sentence from a surface structure of the sentence responsive to the syntactic/semantic encoding of the phrase-chains.

2. Apparatus of claim 1 using frequency of a particular phrase of a phrase-chain used in the generation of a surface structure from a deep structure of natural language.

3. Apparatus of claim 1 wherein the natural language processor uses high-frequency occurring partial phrases of natural language.

4. Apparatus of claim 2 comprising the natural language processor and a natural language generator and combining them to perform language translation using these to drive a surface structure down to deep structure in one language, and back from deep structure up to the surface structure in a second language.

5. Apparatus of claim 1 wherein semantic/syntactic meaning comprises a value of raw frequency of occurrence of a phrase-chain.

6. Apparatus of claim 1 wherein an output of a natural language processor is semantic/syntactic encoding of a word of a phrase-chain, the phrase-chain syntactic/semantic encoding of the word comprising a first component comprising a character or symbol representing an assigned word function comprising article, adjective, noun and verb to the word and a second component representing a number assigned to the word representing the semantic encoding.

7. Apparatus of claim 1 wherein a corpus comprises, a word count between the word count of a typical newspaper article and three billion words.

8. Apparatus of claim 1 wherein the natural language computer processor processes sentences of text files having a length greater than forty words comprising over sixteen phrase-chains.

9. A method of processing natural language comprising tumbling-frequency phrase-chain parsing, the processing method comprising:

reading in a partitioning file comprising text files of a corpus to a partitioning dictionary, the partitioning text file of the corpus for partitioning into sentences and the sentences for partitioning into phrase-chains responsive to a tumbling-frequency phrase chain parsing algorithm of a special purpose natural language processor, a natural language processor reading in a phrase-chain file of a partitioned phrase-chain of a partitioned sentence into a phrase-chain dictionary responsive to a tumbling-frequency phrase-chain parsing algorithm of a special purpose natural language processor, repeatedly processing text files of folders of text files of the corpus to be processed until all text files of the corpus are processed and stored in the partitioning directory responsive to the tumbling-frequency phrase-chain parsing algorithm of the special purpose natural language processor by:

for a complete sentence having subject-verb-object structure, replacing a chain of semantic coding of words of a phrase-chain responsive to the tumbling-frequency phrase-chain parsing algorithm with a single semantic code for the words of the phrase-chain by tagging the single semantic code for the phrase-chain based on a role of each phrase within the subject-verb-object structure, and converting the complete sentence having the subject-verb-object structure to a single semantic representation of a deep structure or meaning of the complete sentence responsive to the tagging of the single semantic code for the phrase-chain within the subject-verb-object structure.

10. The processing method of claim 9, the natural language processor further performing the step of:

the semantic/syntactic encoding of a word of a phrase-chain comprising a first component comprising a character or symbol representing an assigned part of speech comprising article, adjective, noun and verb to the word and a second component comprising a number assigned to the word representing the semantic encoding.

11. The processing method of claim 10, the natural language processor further comprising a natural language generator, the natural language generator performing the step of:

having converted the complete sentence to a single semantic representation of a deep structure or meaning of the complete sentence, using a frequency of particular phrase chains used in the complete sentence to generate surface structure of the complete sentence from the single semantic representation of deep structure or meaning.

12. The processing method of claim 11, the natural language processor and natural language generator performing the step of:

language translation comprising driving a surface structure down to deep structure of the complete sentence in a first language and back to surface structure in a second different language.

\* \* \* \* \*